United States Patent
Abotabl et al.

(10) Patent No.: US 12,490,198 B2
(45) Date of Patent: Dec. 2, 2025

(54) DOWNLINK POWER CONTROL IN WIRELESS COMMUNICATIONS

(71) Applicant: QUALCOMM Incorporated, San Diego, CA (US)

(72) Inventors: Ahmed Attia Abotabl, San Diego, CA (US); Kazuki Takeda, Minato-ku (JP); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 373 days.

(21) Appl. No.: 18/178,978

(22) Filed: Mar. 6, 2023

(65) Prior Publication Data

US 2024/0306093 A1    Sep. 12, 2024

(51) Int. Cl.
| | |
|---|---|
| *H04W 52/40* | (2009.01) |
| *H04L 1/00* | (2006.01) |
| *H04W 24/02* | (2009.01) |
| *H04W 48/08* | (2009.01) |
| *H04W 52/14* | (2009.01) |
| *H04W 52/32* | (2009.01) |
| *H04W 52/36* | (2009.01) |
| *H04W 72/04* | (2023.01) |

(52) U.S. Cl.
CPC ....... *H04W 52/143* (2013.01); *H04W 52/325* (2013.01); *H04W 52/36* (2013.01)

(58) Field of Classification Search
None
See application file for complete search history.

(56) References Cited

U.S. PATENT DOCUMENTS

| | | | | |
|---|---|---|---|---|
| 9,408,085 | B2* | 8/2016 | Abe | H04L 1/0026 |
| 9,572,063 | B2* | 2/2017 | Etemad | H04L 41/082 |
| 9,788,330 | B2* | 10/2017 | Guo | H04L 5/0091 |
| 10,477,577 | B2* | 11/2019 | Jeon | H04W 52/325 |
| 10,485,000 | B2* | 11/2019 | Shaheen | H04W 36/0022 |
| 10,568,050 | B2* | 2/2020 | Jeon | H04W 74/0833 |
| 10,602,496 | B2* | 3/2020 | Davydov | H04L 1/0026 |
| 11,051,256 | B2* | 6/2021 | Jeon | H04W 74/0833 |
| 11,234,268 | B2* | 1/2022 | Jeon | H04W 52/04 |
| 11,283,565 | B2* | 3/2022 | Yamada | H04W 16/32 |
| 11,825,505 | B2* | 11/2023 | Wu | H04L 25/0226 |
| 11,968,141 | B2* | 4/2024 | Tomeba | H04B 7/0639 |
| 12,016,005 | B2* | 6/2024 | Tomeba | H04B 7/0695 |
| 12,096,464 | B2* | 9/2024 | MolavianJazi | H04W 72/56 |
| 12,206,608 | B2* | 1/2025 | Yamada | H04W 56/001 |

OTHER PUBLICATIONS

3GPP: "3rd Generation Partnership Project, Technical Specification Group Radio Access Network, NR, Medium Access Control (MAC) protocol specification (Release 17)", 3GPP TS 38.321, V17.3.0, Dec. 2022, pp. 1-249.
3GPP: "3rd Generation Partnership Project, Technical Specification Group Radio Access Network, NR, Radio Resource Control (RRC) Protocol Specification (Release 17)", 3GPP TS 38.331, V17.3.0, Dec. 2022, pp. 1-1315.

* cited by examiner

*Primary Examiner* — Tuan A Tran
(74) *Attorney, Agent, or Firm* — Dinsmore & Shohl LLP

(57) ABSTRACT

Certain aspects of the present disclosure provide reference signal configurations including transmission power control offsets for multiple cells. In one example, a network entity obtains a reference signal configuration that comprises one or more transmission power control offsets for a first cell and one or more transmission power control offsets for a second cell.

28 Claims, 12 Drawing Sheets

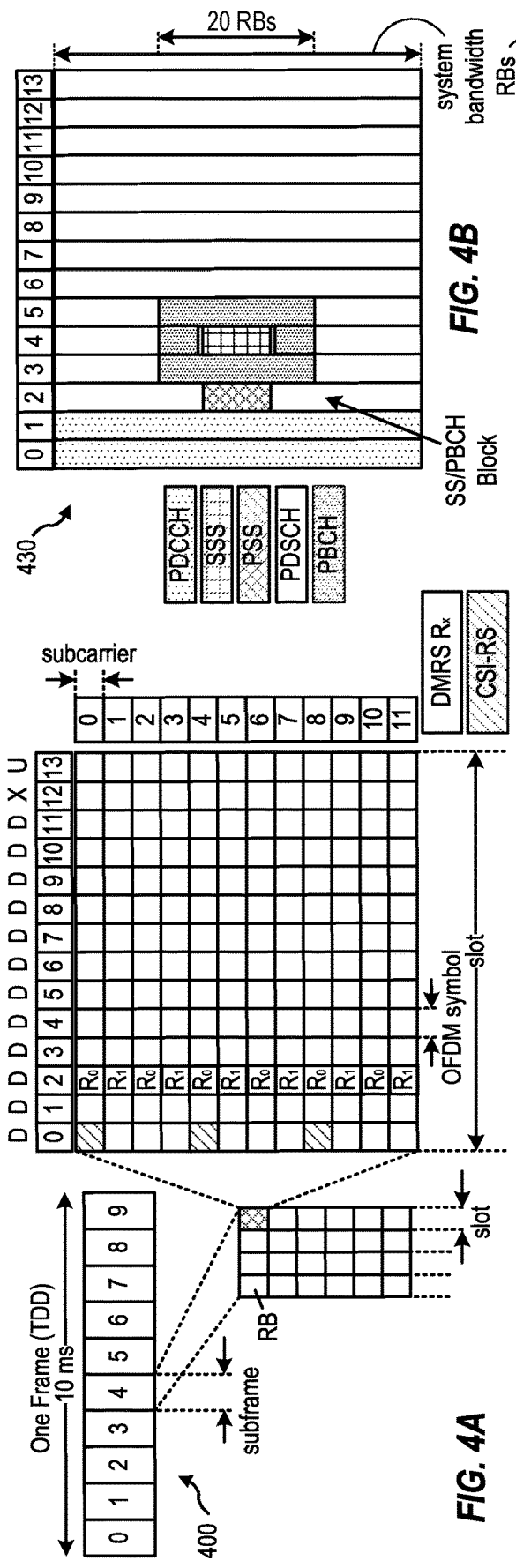
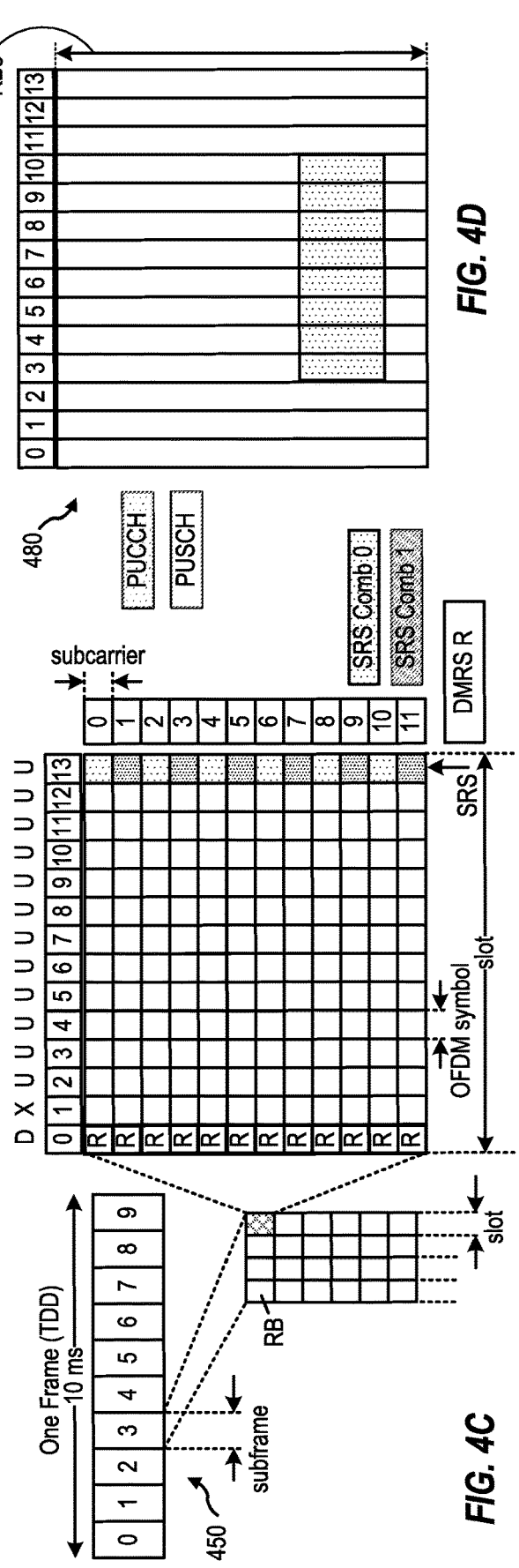

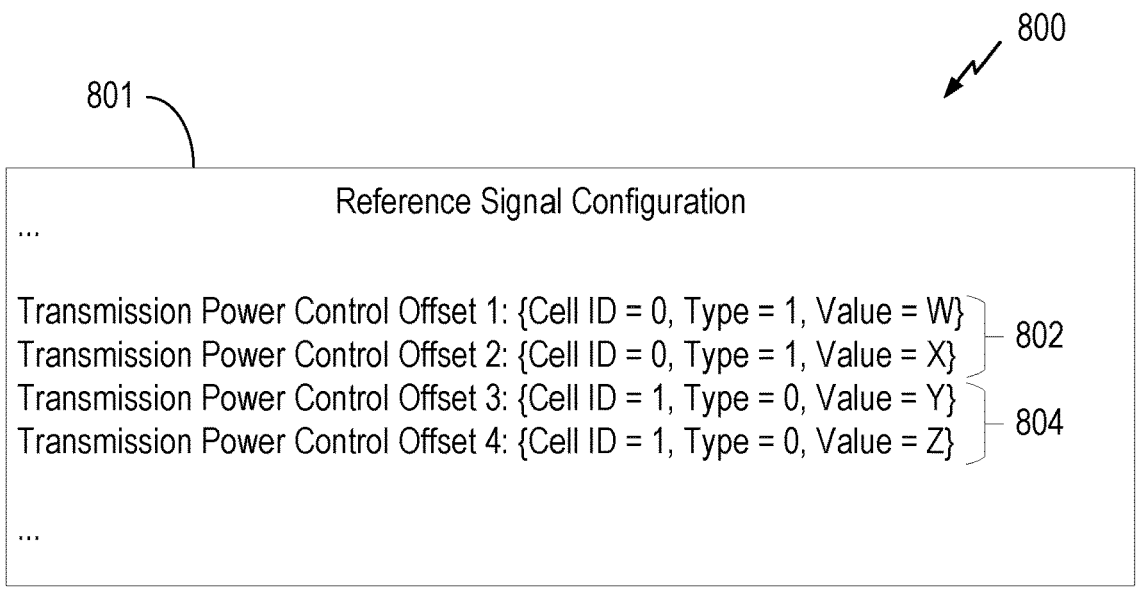
FIG. 8A
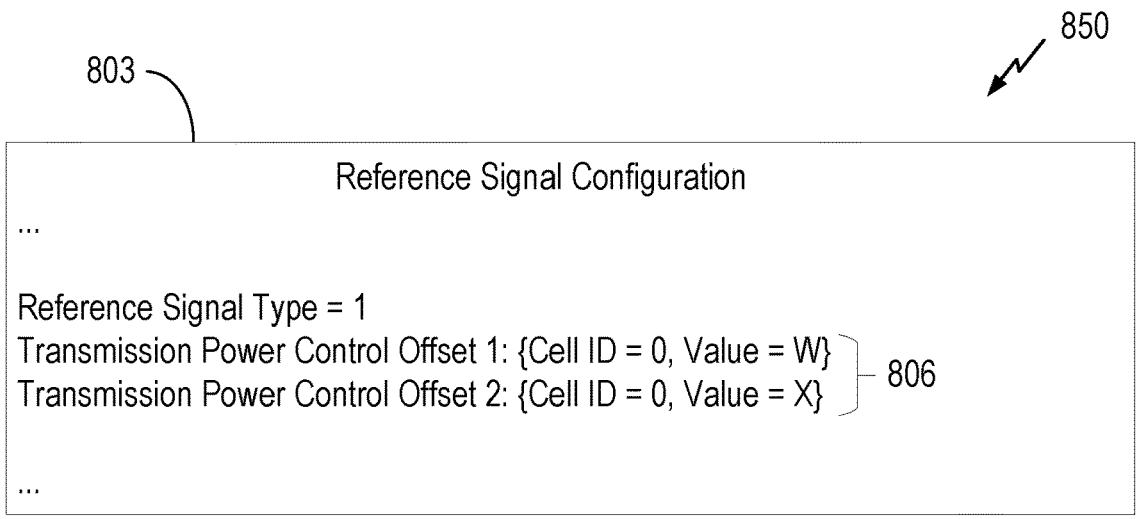
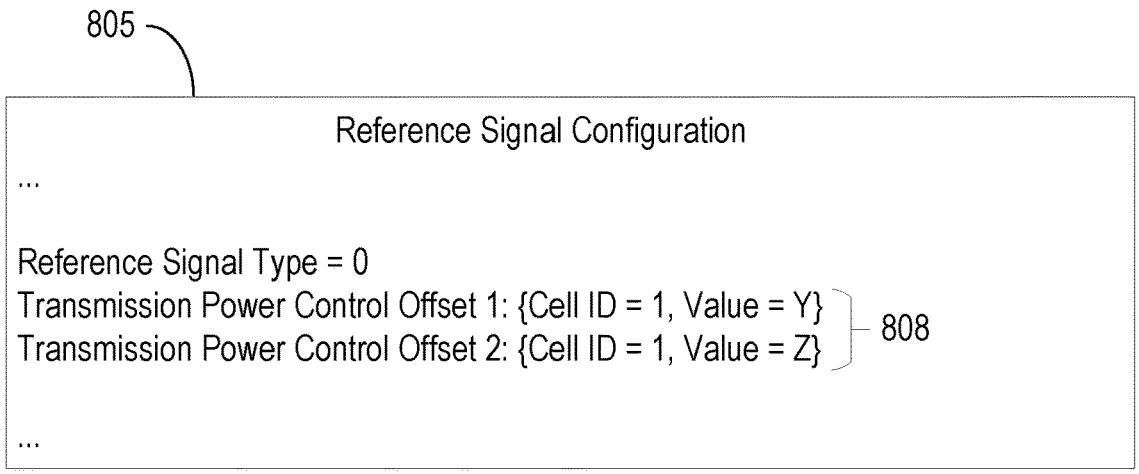
FIG. 8B

DOWNLINK POWER CONTROL IN WIRELESS COMMUNICATIONS

FIELD OF THE DISCLOSURE

Aspects of the present disclosure relate to wireless communications, and more particularly, to techniques for downlink power control in wireless communications.

DESCRIPTION OF RELATED ART

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication performed by a network entity. The method includes comprising obtaining a reference signal configuration that comprises one or more transmission power control offsets for a first cell and one or more transmission power control offsets for a second cell.

Another aspect provides a method for wireless communication performed by a user equipment. The method includes receiving, from a network entity, a reference signal configuration that comprises one or more transmission power control offsets for a first cell and one or more transmission power control offsets for a second cell.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

FIGS. 8A and 8B depict examples of reference signal configurations, such as may be used to define transmission power control offsets between active and inactive cells.

DETAILED DESCRIPTION

Figure 1:
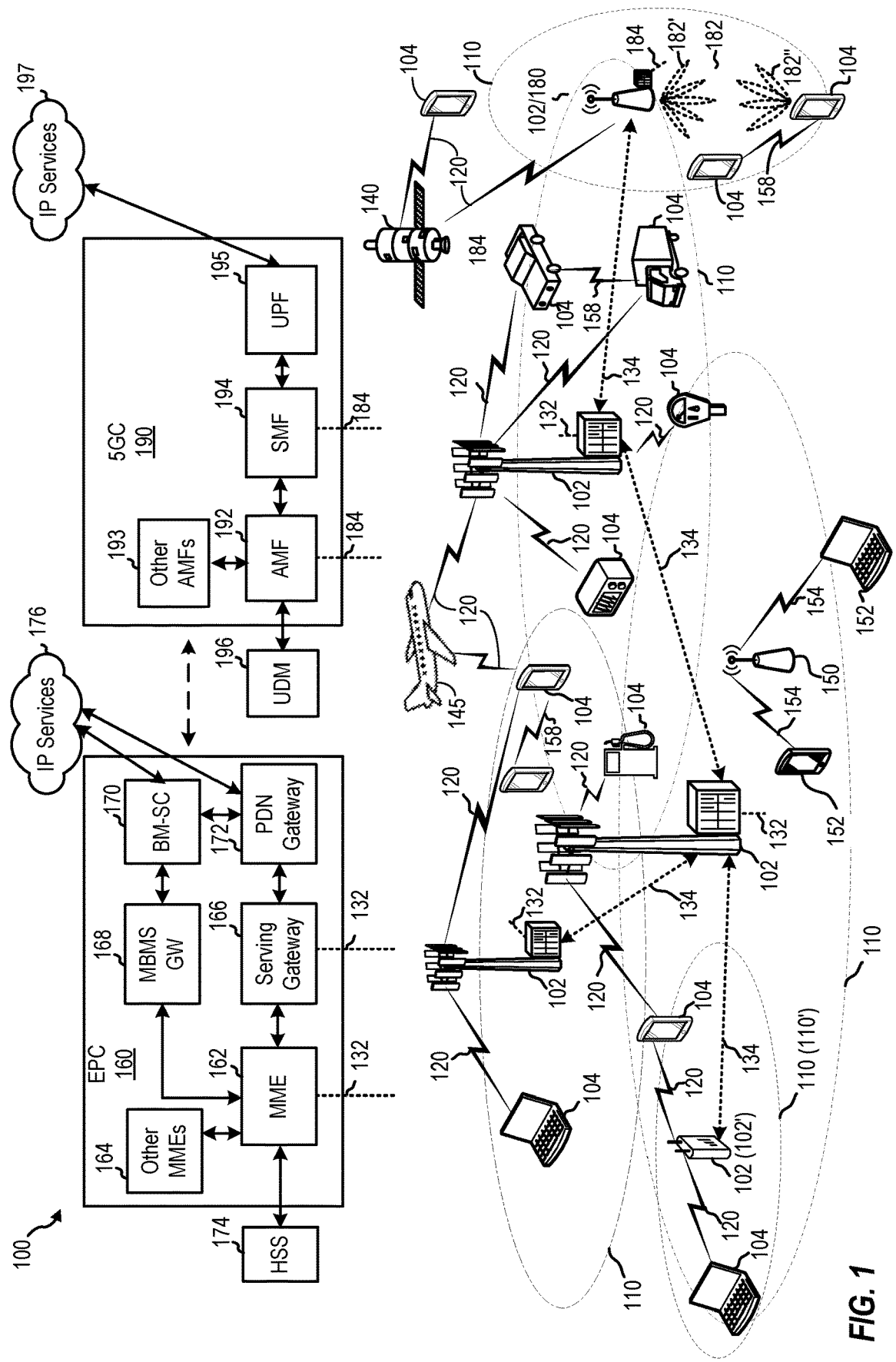
FIG. 1 depicts an example wireless communications network.

Aspects of the present disclosure provide apparatuses, methods, processing systems, and computer-readable mediums for downlink power control in wireless communications.

As wireless communication systems grow in ubiquity and capability, so too do the energy demands of such systems. In particular, often more than half of the energy consumed by a wireless communication system (e.g. a cellular network) is related to the radio access network (RAN) that provides access to and data information exchange between the core network and devices connecting to the network via transmitted and received radio signals. Reducing the energy consumed by wireless communication systems has many beneficial technical effects, such as improved energy efficiency, improved spectrum efficiency, reduced interference, improved sustainability, expanded deployment potential, and others.

One method of improving energy efficiency of a wireless communication system is through the use of transmission power control; in other words, increasing or decreasing transmission power based on various factors. Power control may be implemented in the uplink (e.g., controlling the power of a transmission from a user equipment (UE) to a network entity) as well as in the downlink (e.g., controlling the power of a transmission from a network entity to a UE).

Transmission power control may generally be performed according to static/open-loop power control methods as well as dynamic/closed-loop power control methods. Static power control methods are generally based on preconfigured parameters and assumptions about a wireless transmission channel's performance capability, whereas dynamic power control methods are generally based on actual channel state, such as may be measured based on channel state information reference signals (CSI-RS).

Generally, increasing transmission power has several benefits in a wireless communication system, such as increasing network coverage area, compensating for the effects of path loss, reducing packet loss rate, improving transmission reliability, higher-order modulation coding schemes, and improved spectral efficiency, to name just a few. However, increasing transmission power can also cause interference with other transmissions using the same or similar time-frequency resources and can dramatically increase overall energy consumption in both network entities and UEs. Accordingly, transmission power control involves tradeoffs between competing benefits.

One concept for reducing energy consumption (and thereby increasing energy efficiency) for network entities is dynamically activating and deactivating cells. Generally, a cell may refer to a portion, partition, or segment of wireless communication coverage served by a network entity within a wireless communication network. A cell may have geographic characteristics, such as a geographic coverage area, as well as radio frequency characteristics, such as time and/or frequency resources dedicated to the cell. For example, a specific geographic coverage area may be covered by multiple cells employing different frequency resources (e.g., bandwidth parts) and/or different time resources. As another example, a specific geographic coverage area may be covered by a single cell. Dynamically activating and deactivating cells may be performed for various reasons, such as based on network congestion, presence or absence of connected UEs, capabilities of connected UEs, and the like. For example, a network may deactivate a cell when the congestion level is low or when there are no active UEs connected to that cell. This, in turn, reduces the energy consumed by the network.

In current wireless communication systems, a deactivated (also referred to as an inactive or dormant) cell may nevertheless transmit periodic downlink signals, such as CSI-RS, so that UEs in range of the cell may perform channel state measurements and report the same back to the network. The network in turn uses the channel state measurements for the inactive cell to enable fast switching of the inactive cell to an active (non-dormant) state, also referred to as fast activation. Consequently, significant energy is still consumed by inactive cells in existing systems.

To minimize network energy consumption, it would be beneficial for an inactive cell to forgo transmission of CSI-RS entirely, but not transmitting CSI-RS would compromise the network's ability to monitor channel state and quickly activate cells based on UE needs. For example, if an inactive cell that is not transmitting CSI-RS is activated (e.g., converted to non-dormant) for a fast physical downlink shared channel (PDSCH) transmission, an intended recipient UE would not have a reference for the PDSCH transmission power since the UE is generally configured by current standards to determine that power with reference to a power of a received CSI-RS.

Thus, a technical problem exists with cell deactivation in which network energy savings comes at the cost of network functionality.

Aspects described herein overcome the aforementioned technical problem by implementing reference signal configurations that enable a UE to determine transmission power levels for an inactive cell without receiving reference signals from the inactive cell, but instead based on reference signals transmitted by another cell that is active. In such cases, the active cell may be referred to as an "anchor cell" for the inactive (or "dormant") cell. In some cases, the active cell may be chosen based on having similar cell characteristics (e.g., coverage area, frequency band, time resources, etc.) to the inactive cells such that it acts as a reliable reference for the inactive cell.

Figure 6:
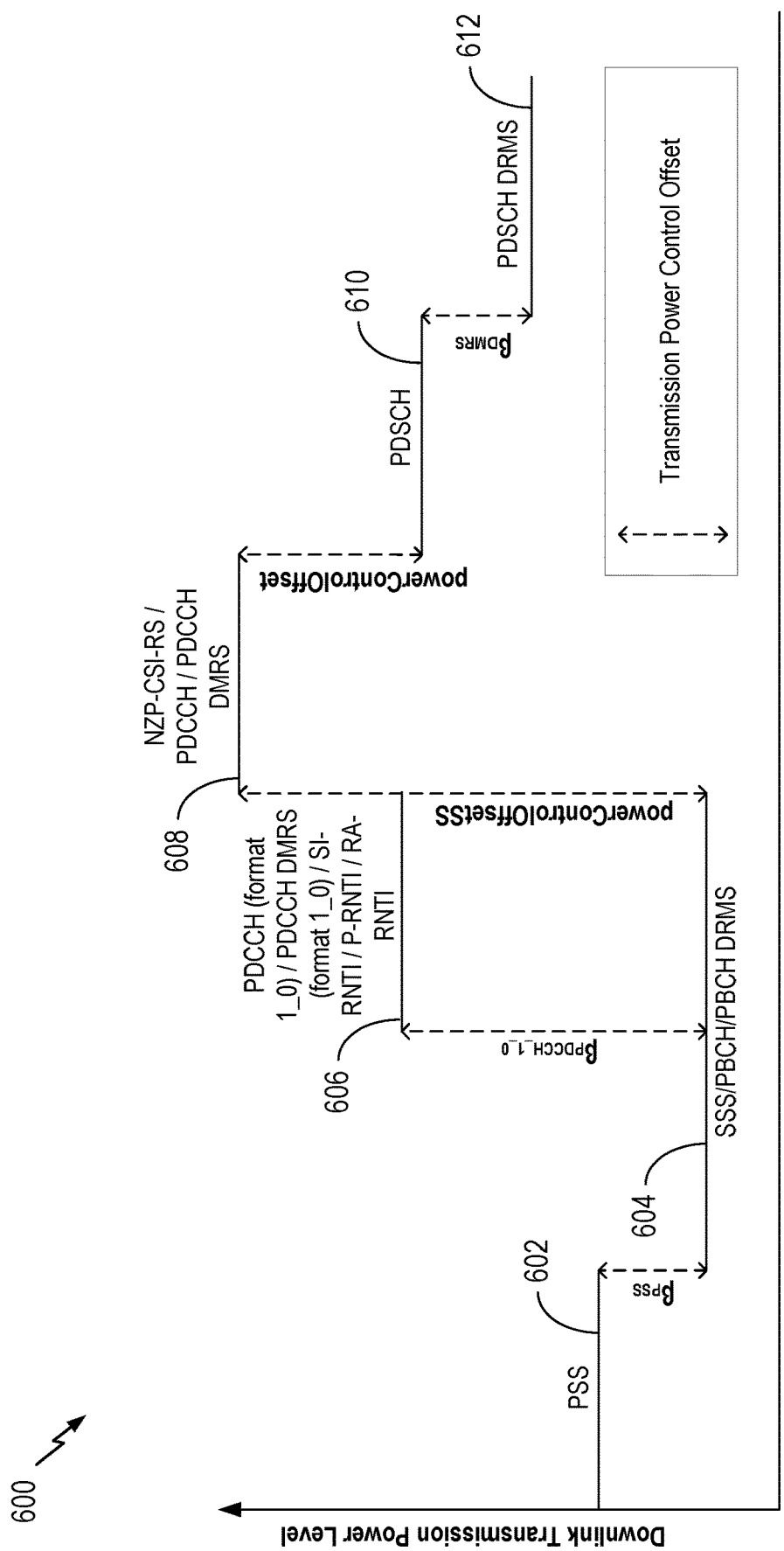
FIG. 6 depicts an example of various transmission power control offsets for downlink transmissions.

Notably, by determining one downlink transmission power level for an inactive cell (e.g., a CSI-RS transmission power level), the UE may also determine other downlink transmission power levels for the inactive cell (e.g., a PDSCH transmission power level), because such other downlink transmission power levels may related to each other by transmission power offsets. In some cases, such offsets may be defined by a standard, such as 3GPP. FIG. 6, described in more detail below, depicts one example.

In aspects described herein, a UE may determine the transmission power levels for the inactive cell by measuring a CSI-RS for an active cell and applying a configured offset to the measured value to determine the transmission power levels for the inactive cell CSI-RS. Further offsets may be defined, for example, to determine other downlink transmission power levels for both the active and inactive cells. Each offset relating an active cell transmission power level to an inactive cell transmission power level may be defined, in some aspects, within a reference signal configuration, such as a CSI-RS information element configuring the reception of the CSI-RS for the active cell.

Accordingly, a beneficial technical effect of a reference signal configuration including transmission power offsets relating an active cell's transmission power level to an inactive cell's transmission power level is that a cell may be deactivated (e.g., put into an inactive state) more often, without reducing network functionality, and while reducing energy consumption, reducing interference, and increasing spectrum efficiency. Additionally, because the inactive cell's downlink transmission power levels are determinable even without transmission of the CSI-RS, the inactive cell may still be activated quickly for on-demand data transmission to a UE. Thus, the best of both network energy savings and network capability are maintained compared to existing systems that must choose between one and the other.

In some aspects described herein, a network entity may enable a reference signal configuration that includes a first transmission power control offset (e.g., a "powerControlOffsetSS" in a NZP-CSI-RS-Resource configuration) between a synchronization signal block (SSB) transmission power for a first cell (e.g., an active cell) and a reference signal (e.g., CSI-RS) transmission power for the first cell; a second transmission power control offset (e.g., a "powerControlOffset" in a NZP-CSI-RS-Resource configuration) between the reference signal transmission power for the first cell and a PDSCH transmission power for the first cell; a third transmission power control offset between a first reference transmission power (e.g., the SSB transmission power for the first cell or the CSI-RS transmission power for the first cell) and a reference signal (e.g. CSI-RS) transmission power for a second cell; and a fourth transmission power control offset between a second reference transmission power (e.g., the reference signal transmission power for the second cell or the PDSCH transmission power for the first cell) and a PDSCH transmission power for the second cell. In such aspects, the third and fourth transmission power control offsets allow the UE to determine downlink transmission power levels for an inactive cell that is not transmitting actual reference signals for measurement and reporting. As such, the third and fourth transmission power control offsets may be referred to as transmission power control offsets for a "virtual" reference signal for an inactive cell, where a virtual reference signal for an inactive cell is a reference signal that is not transmitted, but rather used to determine reference values based on an actual reference signal that is physically received from an active cell.

A related technical problem is how to associate transmission power control offsets for inactive cells with an active cell. In some aspects described herein, transmission power control offsets for inactive cells are defined within a reference signal configuration for an active cell. For example, an active cell may be configured (e.g., in a NZP-CSI-RS-Resource configuration) with a first set of transmission power control offsets for the active cell (e.g., the first and second transmission power control offsets described above) and one or more additional sets of transmission power control offsets (e.g., the third and fourth transmission power control offsets described above) associated with one or more respective inactive cells. In such cases, the first set of transmission power control offsets is used for legacy operation (e.g., based on the active cell's measured channel state) and each other transmission power control offset set is used for an inactive cell. Notably, any number of transmission power control offset sets, each associated with an inactive cell, may be configured within a reference signal configuration for an active cell. In some aspects, each transmission power control offset set may be associated with a physical cell ID (PCI), which is an identification of a cell at physical layer.

In other aspects, rather than defining transmission power control offsets for inactive cells within a reference signal configuration for an active cell, a virtual reference signal configuration may include transmission power control offsets for an inactive cell. In such cases, the virtual reference signal configuration may include an indication (e.g., a data element within a NZP-CSI-RS-Resource configuration) that indicates the reference signal configuration as virtual and thus as a reference signal that will not be actually transmitted. In either of the aforementioned implementations, there is a beneficial technical effect in that virtual reference signals enable a UE to determine transmission power levels for an inactive cell that does not actually transmit the reference signal, and thus network power savings can be realized without reduction in network functionality.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). As such communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
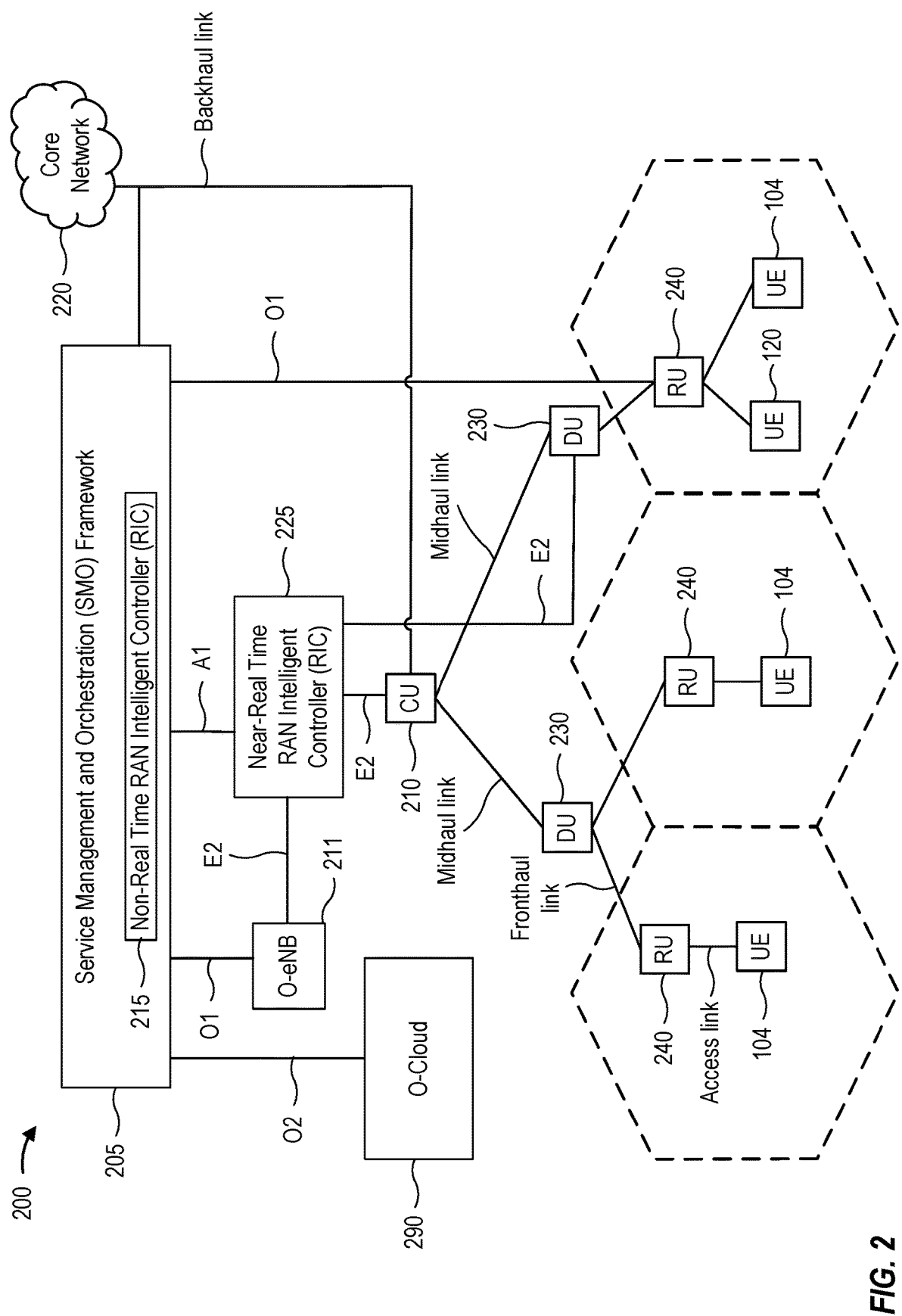
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
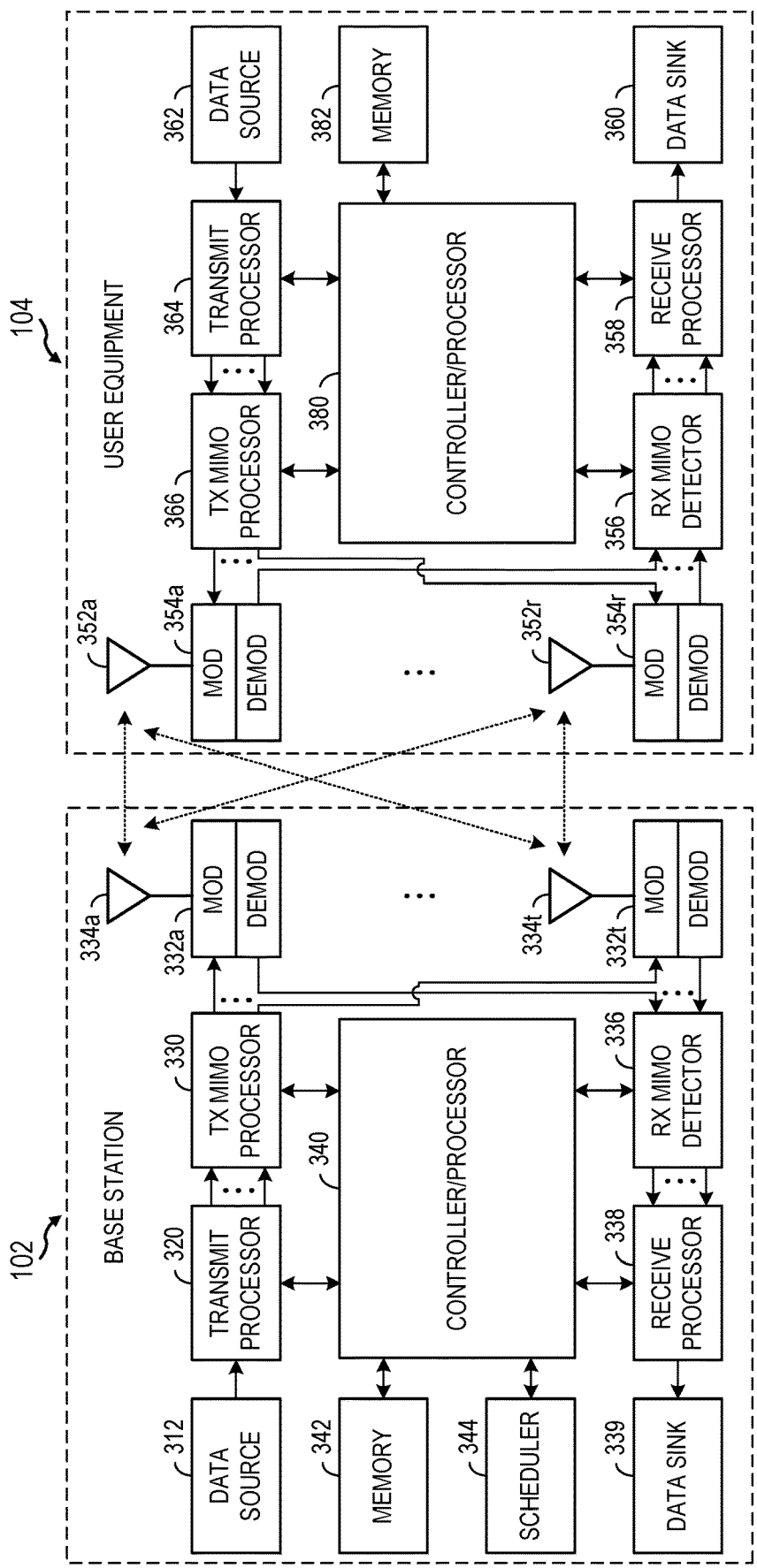
FIG. 3 depicts aspects of an example base station and an example user equipment (UE).

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a RX MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology with 4 slots per subframe. The slot duration is 0.25 ms, the subcarrier μ=2 spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Downlink Power Control

Figure 5:
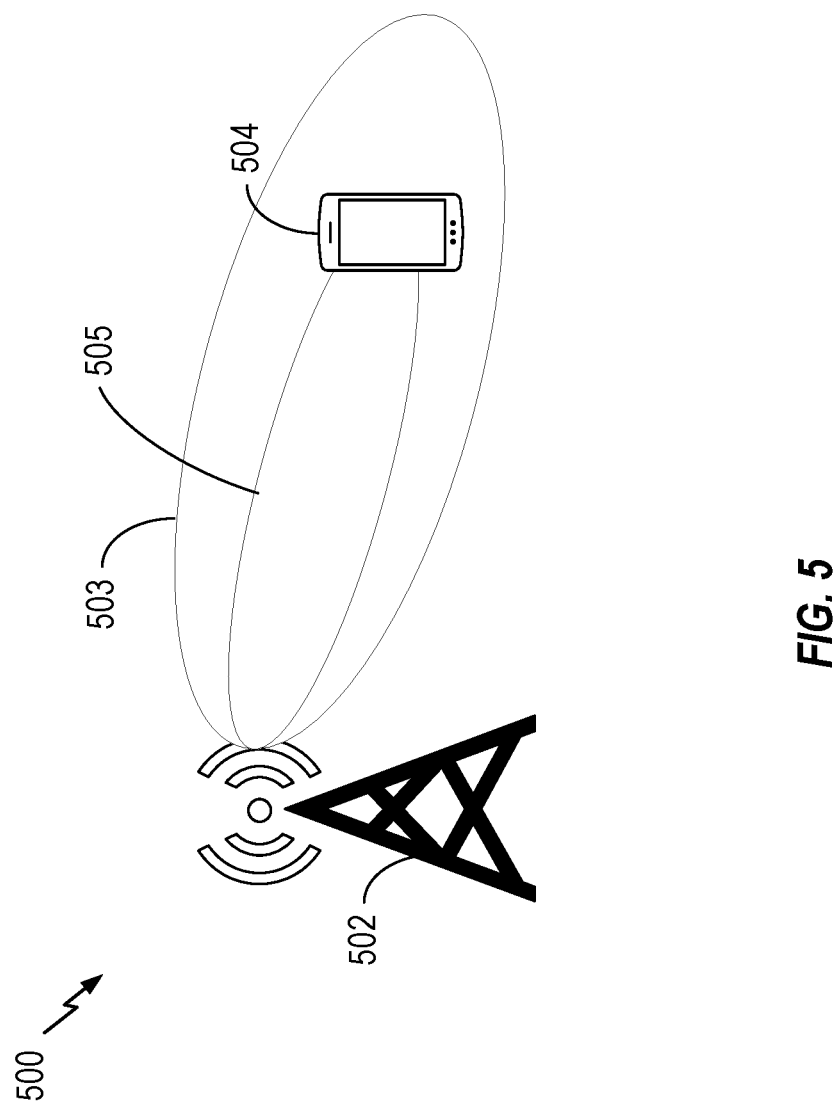
FIG. 5 depicts an example scenario in which a network entity is conducting wireless communications with multiple cells.

FIG. 5 depicts an example scenario 500 in which a network entity 502 (e.g., a base station 102 such as described above with respect to FIGS. 1 and 3 or an aspect of a disaggregated base station as described above with respect to FIG. 2) is conducting wireless communications with UE 504 (e.g., a user equipment 104 such as described above with respect to FIGS. 1 and 3) utilizing multiple cells. In this example, network entity 502 is configured to transmit data (e.g., on the downlink) using cells 503 and 505. In this example, cell 503 has a generally wider coverage area than cell 505, but both provide coverage to UE 504.

In such a scenario, network entity 502 may wish to deactivate one of the cells, e.g., cell 505, and communicate with UE 504 using only cell 503. For example, cell 505 may be a cell utilizing a higher frequency band that is not necessary, or is not as reliable, as cell 503 (e.g., given UE 504 QoS requirements), which may be using a lower frequency band. However, as described above, network entity 502 benefits from UE 504 being able to determine transmission power levels for downlink communications for cell 505 even when cell 505 is inactive. For example, network entity 502 may want to quickly reactivate cell 505 when conditions change on cell 503, or when a faster data transmission is needed, or the like. This would normally require network entity 502 to continue transmitting reference signals using cell 505.

Using the aspects described herein, network entity 502 can deactivate cell 505 (thereby saving network energy consumption) and associate it with cell 503 as an active cell. In this case, cell 503 is a suitable active cell because it covers a similar geographic area (e.g., is transmitted in a similar direction) and thus channel conditions between network entity 502 and UE 504 may be similar as between inactive cell 505 and active cell 503. Network entity 502 may further enable (e.g., to make active or functional) a reference signal configuration that includes transmission power control offsets for active cell 503 as well as transmission power control offsets for inactive cell 505.

Upon receiving a reference signal via cell 503 according to the reference signal configuration, UE 504 may determine not only downlink transmission power levels for active cell 503, but also for inactive cell 505. Thereafter, if network entity 502 decides to perform a fast activation of cell 505 for transmitting data to UE 504, UE 504 will already have determined reference transmission power levels for reactivated cell 505 and thus will be able to successfully receive the transmission.

FIG. 6 depicts an example 600 of various transmission power control offsets for downlink transmissions, such as from a network entity like base station 102 of FIG. 3.

In the depicted example, the primary synchronization signal is transmitted on the downlink at power level 602. The secondary synchronization signal (SSS), physical broadcast channel (PBCH), and PBCH demodulation reference signal (DMRS) are transmitted on the downlink at power level 604, which is offset from the power level 602 by a transmission power control offset "$\beta_{PSS}$." The physical downlink control channel (PDCCH) for format 1_0, PDCCH DMRS for format 1_0, system information radio network temporary identifier (SI-RNTI), paging RNTI (P-RNTI), and random access RNTI (RA-RNTI) are transmitted on the downlink at power level 606, which is offset from the power level 604 by transmission power control offset "$\beta_{PDCCH\_1\_0}$." The non-zero power CSI-RS (NZP-CSI-RS), PDCCH, and PDCCH DMRS are transmitted on the downlink at power level 608, which is offset from the power level 604 by a transmission power control offset "powerControlOffsetSS". The physical downlink shared channel (PDSCH) is transmitted on the downlink at power level 610, which is offset from the power level 608 by a transmission power control offset "powerControlOffset". Finally, the PDSCH DRMS is transmitted on the downlink at power level 612, which is offset from the power level 610 by a transmission power control offset "$\beta_{DMRS}$".

Note that in this example, determining any particular transmission power level enables the determination of any other transmission power level by reference to the various transmission power control offsets. The various transmission power control offsets may be defined, for example, in a standard, or otherwise configured in a wireless communication system so that transmitter (e.g., a network entity) and receiver (e.g., a UE) have a reference point for received powers. In some aspects, the various transmission power control offsets are defined in units of dBm.

Figure 7A:
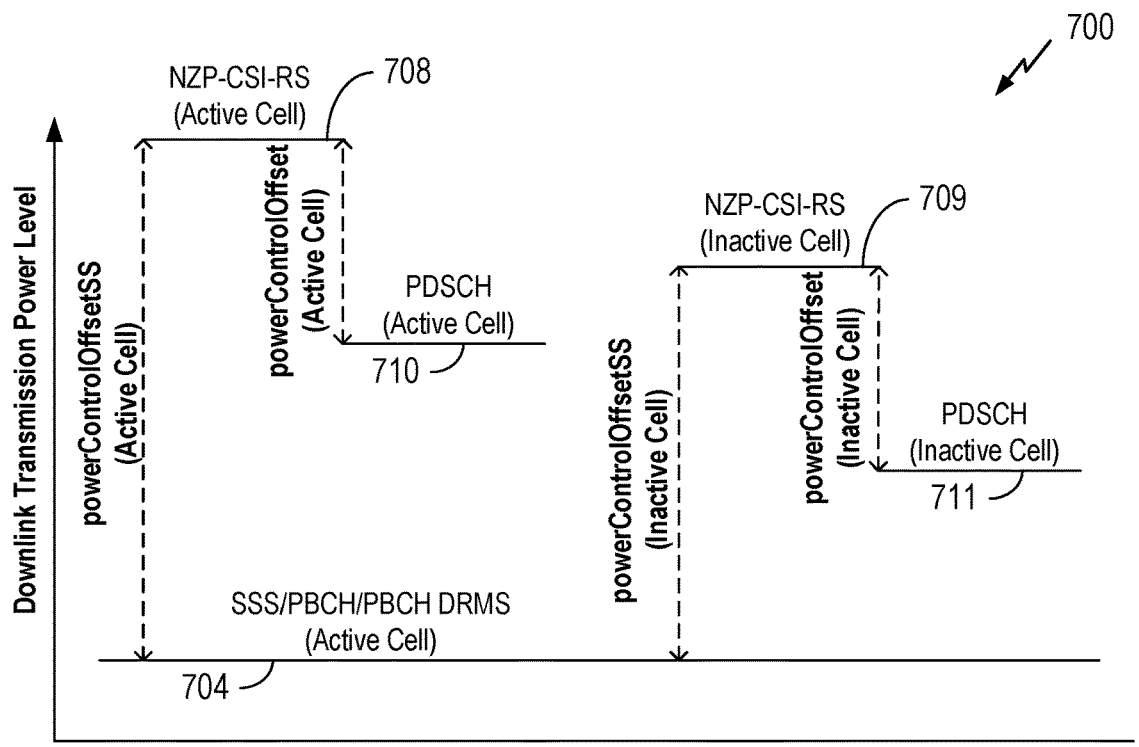
FIGS. 7A and 7B depict two examples of defining transmission power control offsets for an inactive cell based on transmission power control offsets for an active cell.
Figure 7B:
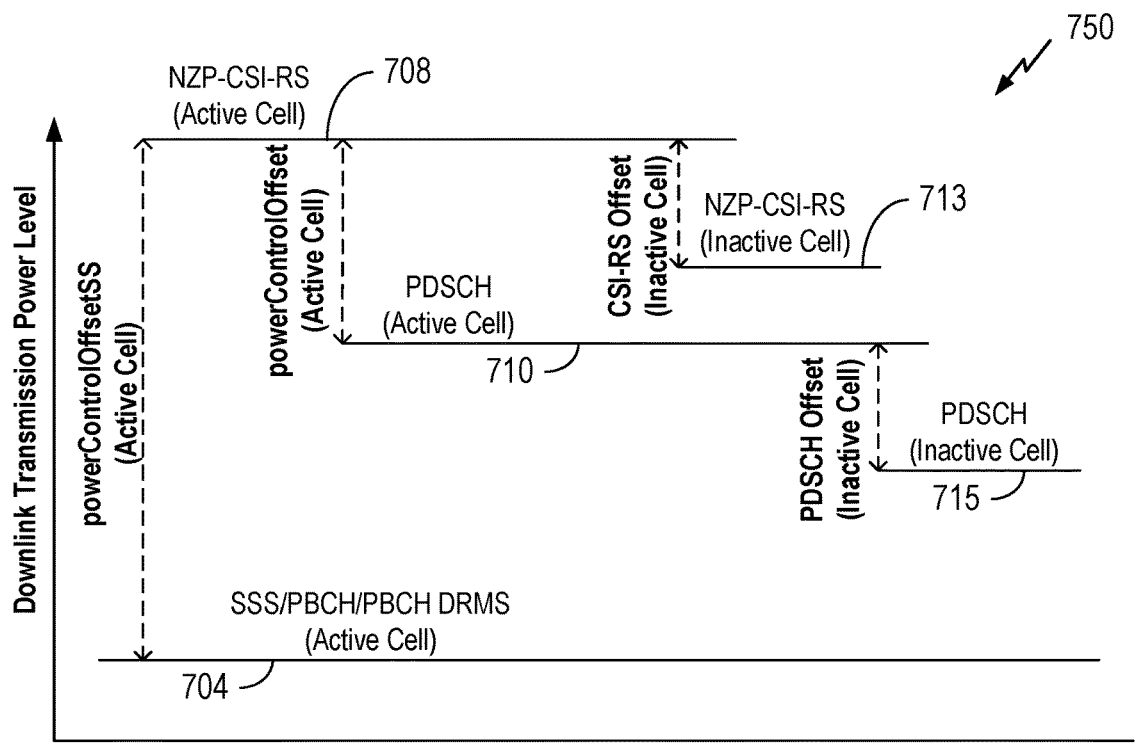

FIGS. 7A and 7B depict two examples (700 and 750) of defining transmission power control offsets for an inactive cell based on transmission power control offsets for an active (e.g., anchor) cell.

In particular, FIG. 7A depicts downlink transmission power levels 704, 708, and 710 for an active cell like those depicted and described with respect to FIG. 6. Additionally, downlink transmission power levels 709 for an inactive cell CSI-RS and 711 for an inactive cell PDSCH are based on inactive cell transmission power control offsets "powerControlOffsetSS (Inactive Cell)" and "powerControlOffset (Inactive Cell)" respectively, which are offsets from the active cell power synchronization signal power level 704.

Accordingly, a UE receiving a synchronization signal from an active cell at power level 704 will be able to determine expected power levels for a CSI-RS and PDSCH for the inactive cell, even without receiving a reference signal (e.g., CSI-RS) from the inactive cell.

Similarly, FIG. 7B depicts downlink transmission power levels 704, 708, and 710 for an active cell like those depicted and described with respect to FIG. 6. Additionally, downlink transmission power levels 713 for an inactive cell CSI-RS and 715 for an inactive cell PDSCH are based on inactive cell transmission power control offsets "CSI-RS Offset (Inactive Cell)" and "PDSCH (Inactive Cell)" respectively. Unlike the example in FIG. 7A, here CSI-RS power level 713 for the inactive cell is offset from CSI-RS power level 708 for the active cell by CSI-RS Offset (Inactive Cell), and PDSCH power level 715 for the inactive cell is offset from PDSCH power level 710 for the active cell by PDSCH Offset (Inactive Cell).

Accordingly, a UE receiving a CSI-RS from an active cell at power level 708 and a PDSCH from an active cell at power level 710 will be able to determine the transmission power level 713 for the CSI-RS on the inactive cell and the transmission power level 715 for the PDSCH on the inactive cell, even without receiving a reference signal (e.g., CSI-RS) from the inactive cell.

As above, the technical effect demonstrated by examples 700 and 750 is that a network can beneficially forgo transmission of reference signals from an inactive cell and rely on the active cell for determination of downlink power for various active cell transmission types (e.g., CSI-RS and PDSCH in this example).

Note that the particular offsets depicted in FIGS. 7A and 7B are examples, and their magnitudes and sign (e.g., positive or negative offset) are likewise examples. Many other offset values are possible. For example, in some cases, a single offset value might be used for both the CSI-RS and PDSCH offset value. Further, while determination of CSI-RS and PDSCH power levels for the inactive cell are depicted and discussed in this example, other downlink transmission power levels may likewise be determined based on suitably defined transmission power control offsets.

FIGS. 8A and 8B depict examples (800 and 850, respectively) of reference signal configurations, such as may be used to define transmission power control offsets between active and inactive cells.

In FIG. 8A, a single reference signal configuration 801 includes transmission power control offsets for multiple cells, including an active cell and an inactive cell. In this example, a set of transmission power control offsets is defined for each cell: set 802 for Cell ID '0' and set 804 for Cell ID '1'. In some aspects, Cell ID '0' may indicate an active (e.g., anchor) cell and Cell ID '1' may indicate an inactive (e.g., dormant) cell that is associated with the active cell.

Further in this example, each transmission power control offset may be defined with respect to multiple parameters, such as a cell ID (e.g., a physical cell ID (PCI)) indicating which cell the transmission power control offset is associated with, a type indicating whether the cell is active or inactive, and a value for the power offset (e.g., in dBm). Note that this is just one example, and others are possible having fewer, additional, or alternative parameters.

Thus, in example 800, a single reference signal configuration may define transmission power control offsets (e.g., in sets) for multiple cells. In some aspects, one set of transmission power control offsets is for an active cell, and one or more additional sets of transmission power control offsets are for inactive cells.

Note that a limited amount of parameters are depicted for reference signal configuration 801 for clarity, and many other parameters may be likewise defined. For example, in some aspects, reference signal configuration 801 may be a NZP-CSI-RS resource configuration (e.g., information element), such as defined by a standard like 3GPP.

In FIG. 8B, different reference signal configurations include transmission power control offsets for different types of cells. In this example, reference signal configuration 803 is for an active (e.g., anchor) cell and reference signal configuration 805 is for an inactive (e.g., dormant) cell.

In particular, reference signal configuration 803 includes a "reference signal type" parameter that indicates whether or not the configured reference signal is intended to be transmitted. When a reference signal is not intended to be transmitted, it may be referred to as a "virtual" reference signal. The configuration of such virtual reference signals may be used by, for example, a UE to determine transmission power levels for inactive cells (e.g., as described above with respect to FIGS. 7A and 7B). In this example, reference signal configuration 803 has reference signal type=1, which indicates an actual reference signal that will be transmitted. Further in this example, reference signal configuration 805 has reference signal type=0, which indicates a virtual reference signal that will be not be transmitted. Note that the type indications here are just one example, and other numbers or values may be used to indicate between the reference signal types.

In this example, each reference signal configuration (803 and 805) includes a set of transmission power control offsets (806 and 808, respectively). Note that while two transmission power control offsets are depicted in each set in this example, other examples may have different numbers of transmission power control offsets, including a single transmission power control offset.

As above with example 800, here each transmission power control offset element includes multiple parameters, such as a cell ID indicating which cell the transmission power control offset is associated with and a value for the power offset. Note that this is just one example, and others are possible having fewer, additional, or alternative parameters.

In the example of FIGS. 8A and 8B, one of the transmission power control offsets may be a "powerControlOffsetSS" offset and another one of the transmission power control offsets may be a "powerControlOffset" as defined in 3GPP.

Example Methods of Downlink Power Control

Figure 9:
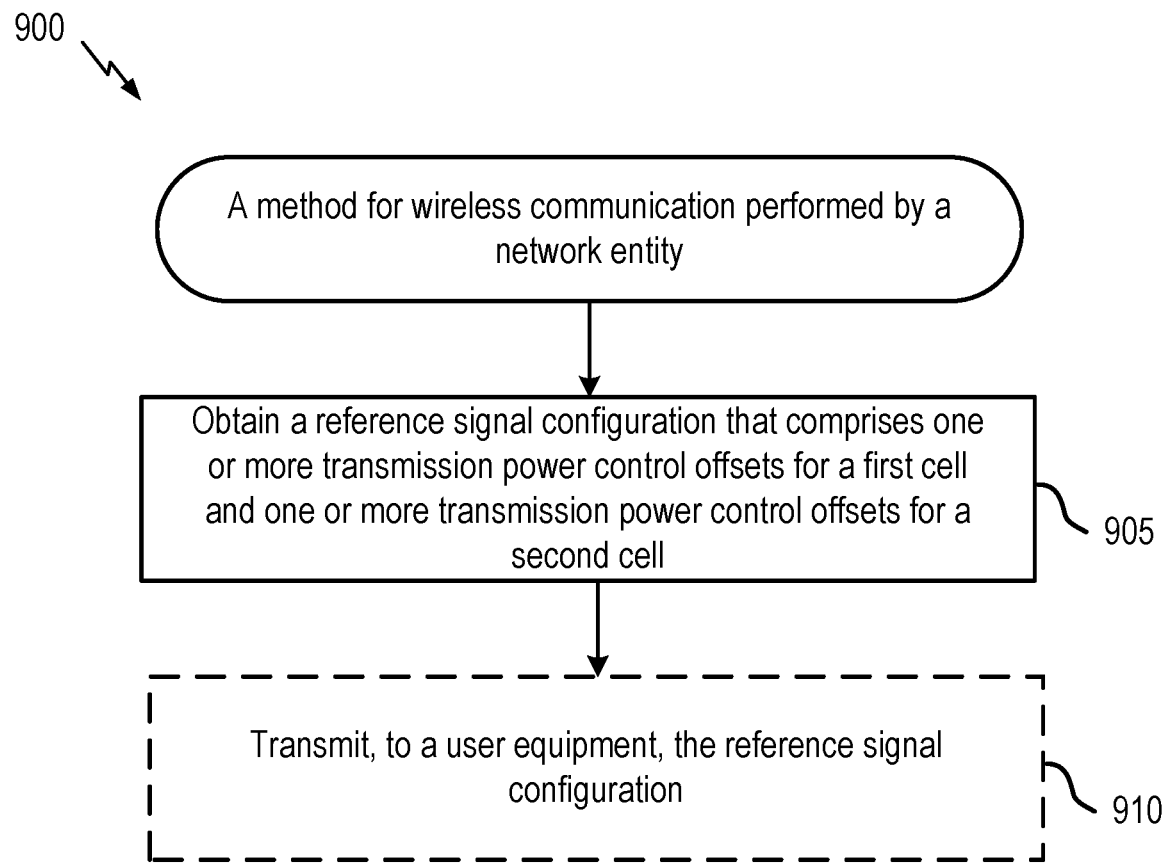
FIG. 9 depicts a method for wireless communications.

FIG. 9 depicts an example method 900 performed by a network entity, such as BS 102 of FIGS. 1 and 3, or a disaggregated base station as discussed with respect to FIG. 2.

Method 900 begins at step 905 with obtaining a reference signal configuration that comprises one or more transmission power control offsets for a first cell and one or more transmission power control offsets for a second cell. In some aspects, the reference signal configuration may be like those described with reference to FIGS. 8A and 8B above.

In some aspects, obtaining the reference signal configuration is accomplished by retrieving the reference signal configuration from a local memory, retrieving the reference signal configuration from a remote memory or data store, receiving the reference signal configuration from another device, such as another network entity, loading the reference signal configuration from an executable code, and the like.

Method 900 then proceeds to optional step 910 with transmitting, to a user equipment, the reference signal configuration. In some aspects, the reference signal configuration is configured to be used by the user equipment to determine a physical downlink shared channel transmission power without receiving reference signals from the second cell.

In some aspects, the one or more transmission power control offsets for the first cell comprise: a first transmission power control offset between a synchronization signal block transmission power for the first cell and a reference signal transmission power for the first cell; and a second transmission power control offset between the reference signal transmission power for the first cell and a physical downlink shared channel transmission power for the first cell. In some aspects, the one or more transmission power control offsets for the second cell comprise: a third transmission power control offset between a first reference transmission power and a reference signal transmission power for the second cell; and a fourth transmission power control offset between a second reference transmission power and a physical downlink shared channel transmission power for the second cell.

In some aspects, the first reference transmission power is the synchronization signal block transmission power for the first cell, and the second reference transmission power is the reference signal transmission power for the second cell.

In some aspects, the first reference transmission power is the reference signal transmission power for the first cell, and the second reference transmission power is the physical downlink shared channel transmission power for the first cell.

In some aspects, the reference signal configuration comprises a channel state information reference signal information element configured for the first cell and comprising the first transmission power control offset, the second transmission power control offset, the third transmission power control offset, and the fourth transmission power control offset.

In some aspects, the reference signal configuration comprises: a channel state information reference signal information element configured for the first cell and comprising the first transmission power control offset and the second transmission power control offset; and a virtual channel state information reference signal information element configured for the second cell and comprising the third transmission power control offset and the fourth transmission power control offset.

In some aspects, the reference signal configuration comprises: a first channel state information reference signal information element configured for the first cell and comprising the first transmission power control offset and the second transmission power control offset; and a second channel state information reference signal information element configured for the second cell and comprising: the third transmission power control offset; the fourth transmission power control offset; and an indication that the second channel state information reference signal information element is a virtual reference signal.

In some aspects, the first transmission power control offset and the second transmission power control offset are associated with a first bandwidth part, and the third transmission power control offset and the fourth transmission power control offset are associated with a second bandwidth part.

In some aspects, the first transmission power control offset and the second transmission power control offset are associated, within the reference signal configuration, with a first physical cell ID (PCI), and the third transmission power control offset and the fourth transmission power control offset are associated, within the reference signal configuration, with a second PCI.

In some aspects, the third transmission power control offset and the fourth transmission power control offset are associated with a virtual reference signal.

In some aspects, the first cell is an active cell, and the second cell is an inactive cell.

In some aspects, the first cell is an active cell, and the second cell is configured for fast activation.

Note that FIG. 9 is just one example of a method, and other methods including fewer, additional, or alternative steps are possible consistent with this disclosure.

Figure 10:
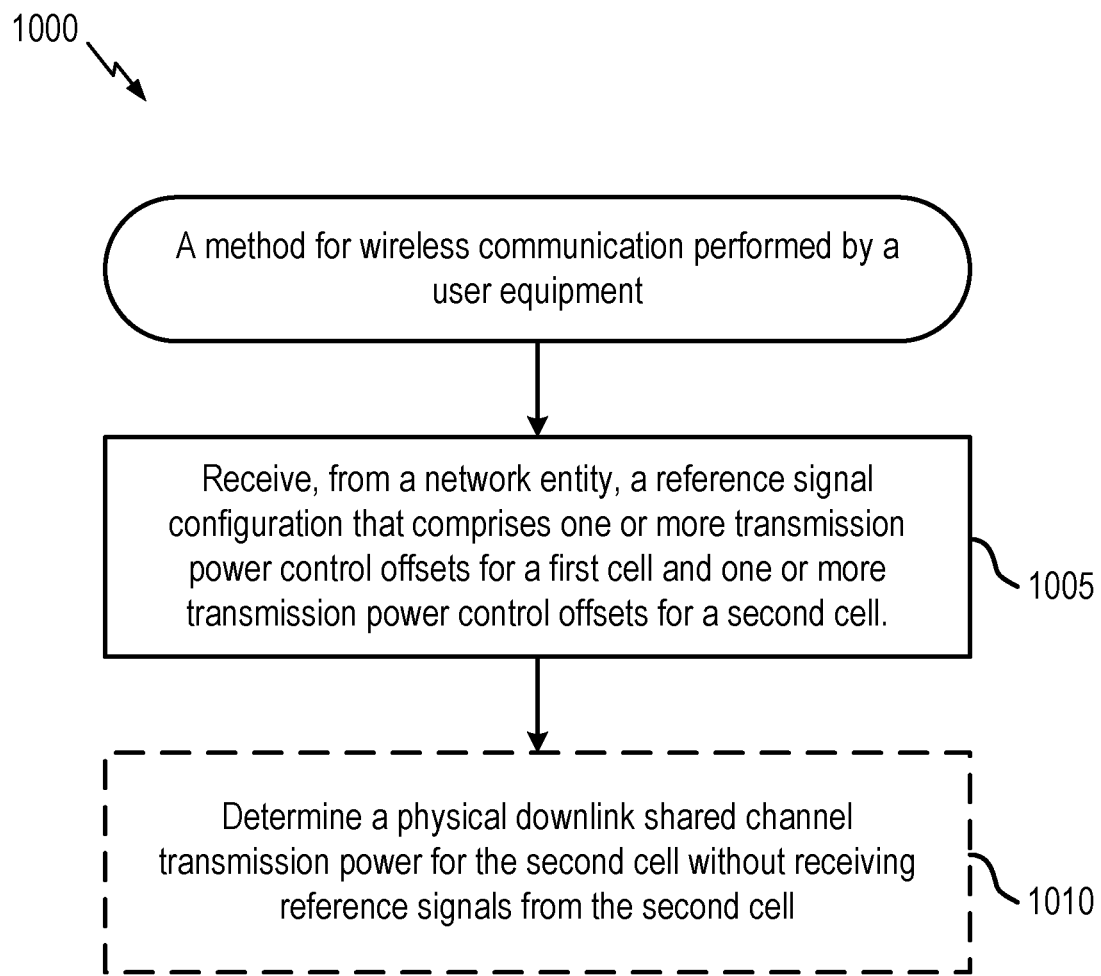
FIG. 10 depicts another method for wireless communications.

FIG. 10 depicts an example method 1000 for wireless communication performed by a user equipment, such as UE 104 of FIGS. 1 and 3.

Method 1000 begins at step 1005 with receiving, from a network entity, a reference signal configuration that comprises one or more transmission power control offsets for a first cell and one or more transmission power control offsets for a second cell.

Method 1000 then proceeds to optional step 1010 with determining a physical downlink shared channel transmission power for the second cell without receiving reference signals from the second cell.

In some aspects, the one or more transmission power control offsets for the first cell comprise: a first transmission power control offset between a synchronization signal block transmission power for the first cell and a reference signal transmission power for the first cell; and a second transmission power control offset between the reference signal transmission power for the first cell and a physical downlink shared channel transmission power for the first cell. In some aspects, the one or more transmission power control offsets for the second cell comprise: a third transmission power control offset between a first reference transmission power and a reference signal transmission power for the second cell; and a fourth transmission power control offset between a second reference transmission power and a physical downlink shared channel transmission power for the second cell.

In some aspects, the first reference transmission power is the synchronization signal block transmission power for the first cell, and the second reference transmission power is the reference signal transmission power for the second cell.

In some aspects, the first reference transmission power is the reference signal transmission power for the first cell, and the second reference transmission power is the physical downlink shared channel transmission power for the first cell.

In some aspects, the reference signal configuration comprises a channel state information reference signal information element configured for the first cell and comprising the first transmission power control offset, the second transmission power control offset, the third transmission power control offset, and the fourth transmission power control offset.

In some aspects, the reference signal configuration comprises: a channel state information reference signal information element configured for the first cell and comprising the first transmission power control offset and the second transmission power control offset; and a virtual channel state information reference signal information element configured for the second cell and comprising the third transmission power control offset and the fourth transmission power control offset.

In some aspects, the reference signal configuration comprises: a first channel state information reference signal information element configured for the first cell and comprising the first transmission power control offset and the second transmission power control offset; and a second channel state information reference signal information element configured for the second cell and comprising: the third transmission power control offset; the fourth transmission power control offset; and an indication that the second channel state information reference signal information element is a virtual reference signal.

In some aspects, the first transmission power control offset and the second transmission power control offset are associated with a first bandwidth part, and the third transmission power control offset and the fourth transmission power control offset are associated with a second bandwidth part.

In some aspects, the first transmission power control offset and the second transmission power control offset are associated, within the reference signal configuration, with a first physical cell ID (PCI), and the third transmission power control offset and the fourth transmission power control offset are associated, within the reference signal configuration, with a second PCI.

In some aspects, the third transmission power control offset and the fourth transmission power control offset are associated with a virtual reference signal.

In some aspects, the first cell is an active cell, and the second cell is an inactive cell.

In some aspects, the first cell is an active cell, and the second cell is configured for fast activation.

Note that FIG. 10 is just one example of a method, and other methods including fewer, additional, or alternative steps are possible consistent with this disclosure.

Example Processing Devices for Downlink Power Control

Figure 11:
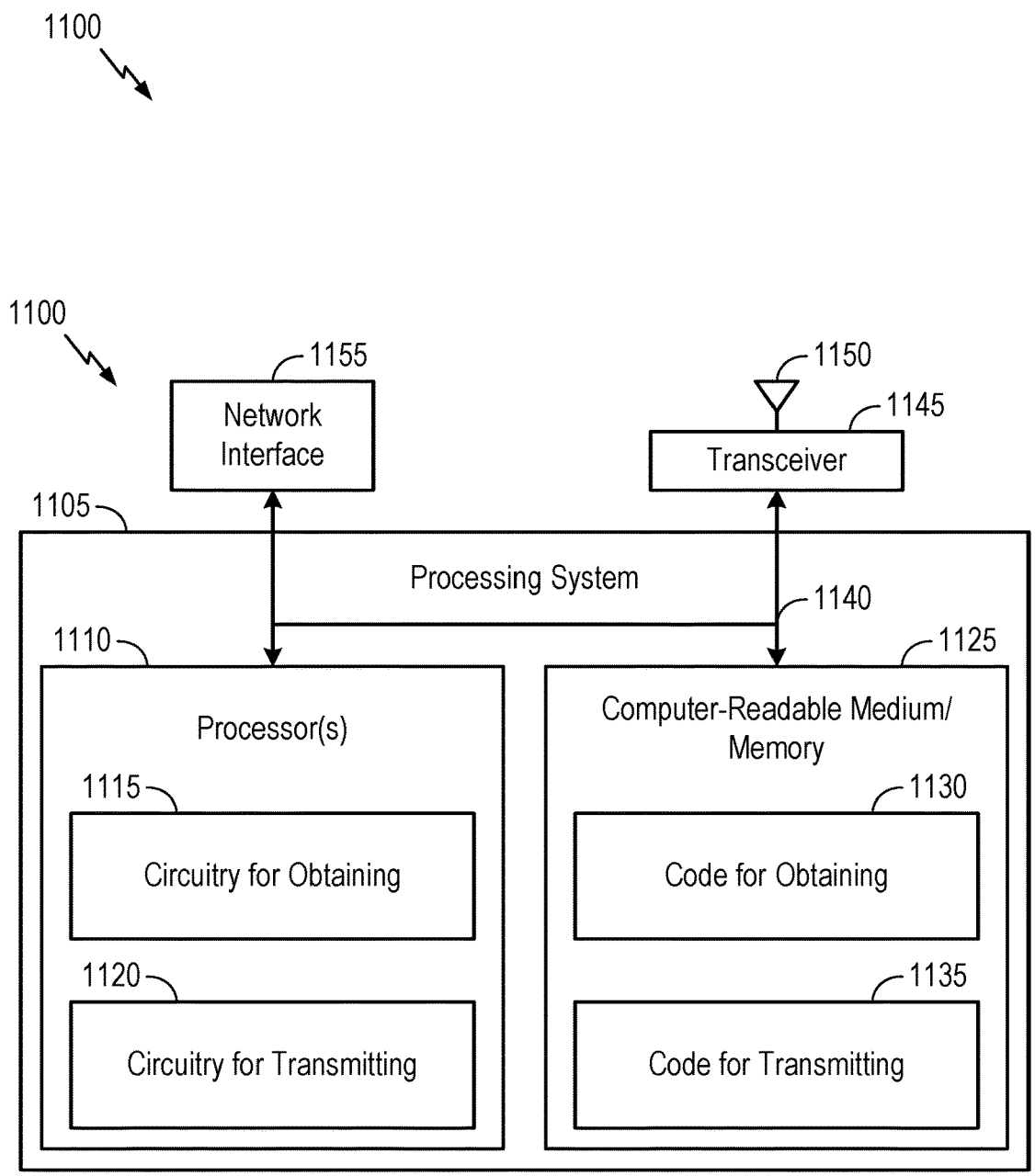
FIG. 11 depicts aspects of an example communications device.

FIG. 11 depicts aspects of an example communications device. In some aspects, communications device 1100 is a network entity, such as BS 102 of FIGS. 1 and 3, or a disaggregated base station as discussed with respect to FIG. 2.

The communications device 1100 includes a processing system 1105 coupled to a transceiver 1145 (e.g., a transmitter and/or a receiver) and/or a network interface 1155. The transceiver 1145 is configured to transmit and receive signals for the communications device 1100 via an antenna 1150, such as the various signals as described herein. The network interface 1155 is configured to obtain and send signals for the communications device 1100 via communications link(s), such as a backhaul link, midhaul link, and/or fronthaul link as described herein, such as with respect to FIG. 2. The processing system 1105 may be configured to perform processing functions for the communications device 1100, including processing signals received and/or to be transmitted by the communications device 1100.

The processing system 1105 includes one or more processors 1110. In various aspects, one or more processors 1110 may be representative of one or more of receive processor 338, transmit processor 320, TX MIMO processor 330, and/or controller/processor 340, as described with respect to FIG. 3. The one or more processors 1110 are coupled to a computer-readable medium/memory 1125 via a bus 1140. In certain aspects, the computer-readable medium/memory 1125 is configured to store instructions (e.g., computer-executable code), including code aspects 1130 and 1135, that when executed by the one or more processors 1110, enable and cause the one or more processors 1110 to perform the method 900 described with respect to FIG. 9, or any aspect related to it, including any additional steps or sub-steps described in relation to FIG. 9. Note that reference to a processor of communications device 1100 performing a function may include one or more processors of communications device 1100 performing that function.

In the depicted example, the computer-readable medium/memory 1125 stores code for obtaining 1130 and code for transmitting 1135. Processing of code 1130 and 1135 may enable and cause the communications device 1100 to perform the method 900 described with respect to FIG. 9, or any aspect related to it.

The one or more processors 1110 include circuitry configured to implement (e.g., execute) the code stored in the computer-readable medium/memory 1125, including circuitry for obtaining 1115 and circuitry for transmitting 1120. Processing with circuitry 1115 and 1120 enable and cause the communications device 1100 to perform the method 900 described with respect to FIG. 9, or any aspect related to it.

More generally, means for communicating, transmitting, sending or outputting for transmission may include the transceivers 332, antenna(s) 334, transmit processor 320, TX MIMO processor 330, and/or controller/processor 340 of the BS 102 illustrated in FIG. 3, transceiver 1145 and/or antenna 1150 of the communications device 1100 in FIG. 11, and/or one or more processors 1110 of the communications device 1100 in FIG. 11. Means for communicating, receiving or obtaining may include the transceivers 332, antenna(s) 334, receive processor 338, and/or controller/processor 340 of the BS 102 illustrated in FIG. 3, transceiver 1145 and/or antenna 1150 of the communications device 1100 in FIG. 11, and/or one or more processors 1110 of the communications device 1100 in FIG. 11.

Figure 12:
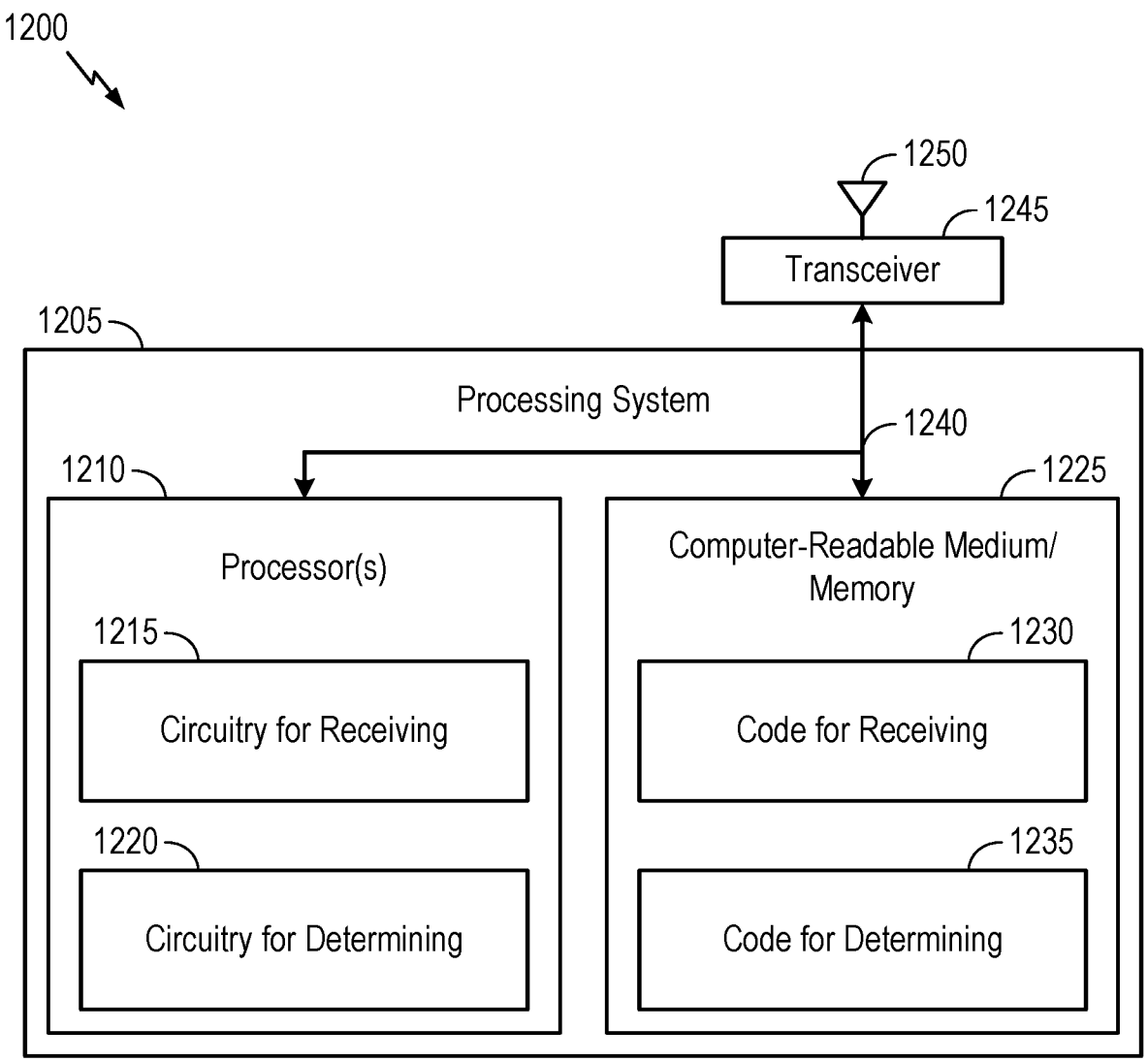
FIG. 12 depicts aspects of an example communications device.

FIG. 12 depicts aspects of an example communications device 1200. In some aspects, communications device 1200 is a user equipment, such as UE 104 described above with respect to FIGS. 1 and 3.

The communications device 1200 includes a processing system 1205 coupled to a transceiver 1245 (e.g., a transmitter and/or a receiver). The transceiver 1245 is configured to transmit and receive signals for the communications device 1200 via an antenna 1250, such as the various signals as described herein. The processing system 1205 may be configured to perform processing functions for the communications device 1200, including processing signals received and/or to be transmitted by the communications device 1200.

The processing system 1205 includes one or more processors 1210. In various aspects, the one or more processors 1210 may be representative of one or more of receive processor 358, transmit processor 364, TX MIMO processor 366, and/or controller/processor 380, as described with respect to FIG. 3. The one or more processors 1210 are coupled to a computer-readable medium/memory 1225 via a bus 1240. In certain aspects, the computer-readable medium/memory 1225 is configured to store instructions (e.g., computer-executable code), including code aspects 1230 and 1235, that when executed by the one or more processors 1210, enable and cause the one or more processors 1210 to perform the method 1000 described with respect to FIG. 10, or any aspect related to it, including any additional steps or sub-steps described in relation to FIG. 10. Note that reference to a processor performing a function of communications device 1200 may include one or more processors performing that function of communications device 1200.

In the depicted example, computer-readable medium/memory 1225 stores code for receiving 1230 and code for determining 1235. Processing of code 1230 and 1235 may enable and cause the communications device 1200 to perform the method 1000 described with respect to FIG. 10, or any aspect related to it.

The one or more processors 1210 include circuitry configured to implement (e.g., execute) the code stored in the computer-readable medium/memory 1225, including circuitry for receiving 1215 and circuitry for determining 1220. Processing with circuitry 1215 and 1220 may enable and cause the communications device 1200 to perform the method 1000 described with respect to FIG. 10, or any aspect related to it.

More generally, means for communicating, transmitting, sending or outputting for transmission may include the transceivers 354, antenna(s) 352, transmit processor 364, TX MIMO processor 366, and/or controller/processor 380 of the UE 104 illustrated in FIG. 3, transceiver 1245 and/or antenna 1250 of the communications device 1200 in FIG. 12, and/or one or more processors 1210 of the communications device 1200 in FIG. 12. Means for communicating, receiving or obtaining may include the transceivers 354, antenna(s) 352, receive processor 358, and/or controller/processor 380 of the UE 104 illustrated in FIG. 3, transceiver 1245 and/or antenna 1250 of the communications device 1200 in FIG. 12, and/or one or more processors 1210 of the communications device 1200 in FIG. 12.

Example Clauses

Implementation examples are described in the following numbered clauses:

Clause 1: A method for wireless communication performed by a network entity, comprising obtaining a reference signal configuration that comprises one or more transmission power control offsets for a first cell and one or more transmission power control offsets for a second cell.

Clause 2: The method of Clause 1, further comprising transmitting, to a user equipment, the reference signal configuration, wherein the reference signal configuration is configured to be used by the user equipment to determine a physical downlink shared channel transmission power without receiving reference signals from the second cell.

Clause 3: The method of any one of Clauses 1-2, wherein: the one or more transmission power control offsets for the first cell comprise: a first transmission power control offset between a synchronization signal block transmission power for the first cell and a reference signal transmission power for the first cell; and a second transmission power control offset between the reference signal transmission power for the first cell and a physical downlink shared channel transmission power for the first cell; and the one or more transmission power control offsets for the second cell comprise: a third transmission power control offset between a first reference transmission power and a reference signal transmission power for the second cell; and a fourth transmission power control offset between a second reference transmission power and a physical downlink shared channel transmission power for the second cell.

Clause 4: The method of Clause 3, wherein: the first reference transmission power is the synchronization signal block transmission power for the first cell, and the second reference transmission power is the reference signal transmission power for the second cell.

Clause 5: The method of Clause 3, wherein: the first reference transmission power is the reference signal transmission power for the first cell, and the second reference transmission power is the physical downlink shared channel transmission power for the first cell.

Clause 6: The method of any one of Clauses 3-5, wherein the reference signal configuration comprises a channel state information reference signal information element configured for the first cell and comprising the first transmission power control offset, the second transmission power control offset, the third transmission power control offset, and the fourth transmission power control offset.

Clause 7: The method of any one of Clauses 3-5, wherein the reference signal configuration comprises: a channel state information reference signal information element configured for the first cell and comprising the first transmission power control offset and the second transmission power control offset; and a virtual channel state information reference signal information element configured for the second cell and comprising the third transmission power control offset and the fourth transmission power control offset.

Clause 8: The method of any one of Clauses 3-5, wherein the reference signal configuration comprises: a first channel state information reference signal information element configured for the first cell and comprising the first transmission power control offset and the second transmission power control offset; and a second channel state information reference signal information element configured for the second cell and comprising: the third transmission power control offset; the fourth transmission power control offset; and an indication that the second channel state information reference signal information element is a virtual reference signal.

Clause 9: The method of any one of Clauses 3-8, wherein: the first transmission power control offset and the second transmission power control offset are associated with a first bandwidth part, and the third transmission power control offset and the fourth transmission power control offset are associated with a second bandwidth part.

Clause 10: The method of any one of Clauses 3-9, wherein: the first transmission power control offset and the second transmission power control offset are associated, within the reference signal configuration, with a first physical cell ID (PCI), and the third transmission power control offset and the fourth transmission power control offset are associated, within the reference signal configuration, with a second PCI.

Clause 11: The method of any one of Clauses 3-10, wherein the third transmission power control offset and the fourth transmission power control offset are associated with a virtual reference signal.

Clause 12: The method of any one of Clauses 3-11, wherein: the first cell is an active cell, and the second cell is an inactive cell.

Clause 13: The method of any one of Clauses 3-11, wherein: the first cell is an active cell, and the second cell is configured for fast activation.

Clause 14: A method for wireless communication performed by a user equipment, comprising receiving, from a network entity, a reference signal configuration that comprises one or more transmission power control offsets for a first cell and one or more transmission power control offsets for a second cell.

Clause 15: The method of Clause 14, further comprising: determining a physical downlink shared channel transmission power for the second cell without receiving reference signals from the second cell.

Clause 16: The method of any one of Clauses 14-15, wherein: the one or more transmission power control offsets for the first cell comprise: a first transmission power control offset between a synchronization signal block transmission power for the first cell and a reference signal transmission power for the first cell; and a second transmission power control offset between the reference signal transmission power for the first cell and a physical downlink shared channel transmission power for the first cell; and the one or more transmission power control offsets for the second cell comprise: a third transmission power control offset between a first reference transmission power and a reference signal transmission power for the second cell; and a fourth transmission power control offset between a second reference transmission power and a physical downlink shared channel transmission power for the second cell.

Clause 17: The method of Clause 16, wherein: the first reference transmission power is the synchronization signal block transmission power for the first cell, and the second reference transmission power is the reference signal transmission power for the second cell.

Clause 18: The method of Clause 16, wherein: the first reference transmission power is the reference signal transmission power for the first cell, and the second reference transmission power is the physical downlink shared channel transmission power for the first cell.

Clause 19: The method of any one of Clauses 16-18, wherein the reference signal configuration comprises a channel state information reference signal information element configured for the first cell and comprising the first transmission power control offset, the second transmission power control offset, the third transmission power control offset, and the fourth transmission power control offset.

Clause 20: The method of any one of Clauses 16-18, wherein the reference signal configuration comprises: a channel state information reference signal information element configured for the first cell and comprising the first transmission power control offset and the second transmission power control offset; and a virtual channel state information reference signal information element configured for the second cell and comprising the third transmission power control offset and the fourth transmission power control offset.

Clause 21: The method of any one of Clauses 16-18, wherein the reference signal configuration comprises: a first channel state information reference signal information element configured for the first cell and comprising the first transmission power control offset and the second transmission power control offset; and a second channel state information reference signal information element configured for the second cell and comprising: the third transmission power control offset; the fourth transmission power control offset; and an indication that the second channel state information reference signal information element is a virtual reference signal.

Clause 22: The method of any one of Clauses 16-21, wherein: the first transmission power control offset and the second transmission power control offset are associated with a first bandwidth part, and the third transmission power control offset and the fourth transmission power control offset are associated with a second bandwidth part.

Clause 23: The method of any one of Clauses 16-22, wherein: the first transmission power control offset and the second transmission power control offset are associated, within the reference signal configuration, with a first physical cell ID (PCI), and the third transmission power control offset and the fourth transmission power control offset are associated, within the reference signal configuration, with a second PCI.

Clause 24: The method of any one of Clauses 16-23, wherein the third transmission power control offset and the fourth transmission power control offset are associated with a virtual reference signal.

Clause 25: The method of any one of Clauses 16-24, wherein: the first cell is an active cell, and the second cell is an inactive cell.

Clause 26: The method of any one of Clauses 16-24, wherein: the first cell is an active cell, and the second cell is configured for fast activation.

Clause 27: A processing system, comprising: a memory having executable instructions stored thereon; and a processor configured to execute the executable instructions to cause the processing system to perform the operations of any one of Clauses 1 through 26.

Clause 28: A processing system, comprising: means for performing the operations of any one of Clauses 1 through 26.

Clause 29: A computer-readable medium having executable instructions stored thereon which, when executed by a processor, causes the processor to perform the operations of any one of clauses 1 through 26.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A network entity configured for wireless communications, comprising: a memory comprising processor-executable instructions; and a processor configured to execute the processor-executable instructions and cause the network entity to:
   obtain a reference signal configuration that comprises one or more transmission power control offsets for a first cell and one or more transmission power control offsets for a second cell,
   wherein the one or more transmission power control offsets for the first cell comprise a first transmission power control offset between a synchronization signal block transmission power for the first cell and a reference signal transmission power for the first cell.

2. The network entity of claim 1, wherein the processor is further configured to execute the processor-executable instructions and cause the network entity to:
   transmit, to a user equipment, the reference signal configuration,
   wherein the reference signal configuration is configured to be used by the user equipment to determine a physical downlink shared channel transmission power without receiving reference signals from the second cell.

3. The network entity of claim 1, wherein:
   the one or more transmission power control offsets for the first cell further comprise:
      a second transmission power control offset between the reference signal transmission power for the first cell and a physical downlink shared channel transmission power for the first cell; and
   the one or more transmission power control offsets for the second cell comprise:
      a third transmission power control offset between a first reference transmission power and a reference signal transmission power for the second cell; and
      a fourth transmission power control offset between a second reference transmission power and a physical downlink shared channel transmission power for the second cell.

4. The network entity of claim 3, wherein:
   the first reference transmission power is the synchronization signal block transmission power for the first cell, and
   the second reference transmission power is the reference signal transmission power for the second cell.

5. The network entity of claim 3, wherein:
   the first reference transmission power is the reference signal transmission power for the first cell, and
   the second reference transmission power is the physical downlink shared channel transmission power for the first cell.

6. The network entity of claim 3, wherein the reference signal configuration comprises a channel state information reference signal information element configured for the first cell and comprising the first transmission power control offset, the second transmission power control offset, the third transmission power control offset, and the fourth transmission power control offset.

7. The network entity of claim 3, wherein the reference signal configuration comprises:
   a channel state information reference signal information element configured for the first cell and comprising the first transmission power control offset and the second transmission power control offset; and
   a virtual channel state information reference signal information element configured for the second cell and comprising the third transmission power control offset and the fourth transmission power control offset.

8. The network entity of claim 3, wherein the reference signal configuration comprises:
   a first channel state information reference signal information element configured for the first cell and comprising the first transmission power control offset and the second transmission power control offset; and
   a second channel state information reference signal information element configured for the second cell and comprising:
      the third transmission power control offset;
      the fourth transmission power control offset; and
      an indication that the second channel state information reference signal information element is a virtual reference signal.

9. The network entity of claim 3, wherein:
   the first transmission power control offset and the second transmission power control offset are associated with a first bandwidth part, and
   the third transmission power control offset and the fourth transmission power control offset are associated with a second bandwidth part.

10. The network entity of claim 3, wherein:
    the first transmission power control offset and the second transmission power control offset are associated, within the reference signal configuration, with a first physical cell ID (PCI), and
    the third transmission power control offset and the fourth transmission power control offset are associated, within the reference signal configuration, with a second PCI.

11. The network entity of claim 3, wherein the third transmission power control offset and the fourth transmission power control offset are associated with a virtual reference signal.

12. The network entity of claim 3, wherein:
    the first cell is an active cell, and
    the second cell is an inactive cell.

13. The network entity of claim 3, wherein:
    the first cell is an active cell, and
    the second cell is configured for fast activation.

14. A method for wireless communication performed by a network entity, comprising:
    obtaining a reference signal configuration that comprises one or more transmission power control offsets for a first cell and one or more transmission power control offsets for a second cell,
    wherein the one or more transmission power control offsets for the first cell comprise a first transmission control offset between a synchronization signal block transmission power for the first cell and a reference signal transmission power for the first cell.

15. A user equipment configured for wireless communications, comprising: a memory comprising processor-executable instructions; and a processor configured to execute the processor-executable instructions and cause the user equipment to:
    receive, from a network entity, a reference signal configuration that comprises one or more transmission power control offsets for a first cell and one or more transmission power control offsets for a second cell,
    wherein the one or more transmission power control offsets for first cell comprise a first transmission power control offset between a synchronization signal block transmission power for the first cell and a reference signal power for the first cell.

16. The user equipment of claim 15, wherein the processor is further configured to execute the processor-executable instructions and cause the user equipment to determine a physical downlink shared channel transmission power for the second cell without receiving reference signals from the second cell.

17. The user equipment of claim 15, wherein:
the one or more transmission power control offsets for the first cell further comprise:
a second transmission power control offset between the reference signal transmission power for the first cell and a physical downlink shared channel transmission power for the first cell; and
the one or more transmission power control offsets for the second cell comprise:
a third transmission power control offset between a first reference transmission power and a reference signal transmission power for the second cell; and
a fourth transmission power control offset between a second reference transmission power and a physical downlink shared channel transmission power for the second cell.

18. The user equipment of claim 17, wherein:
the first reference transmission power is the synchronization signal block transmission power for the first cell, and
the second reference transmission power is the reference signal transmission power for the second cell.

19. The user equipment of claim 17, wherein:
the first reference transmission power is the reference signal transmission power for the first cell, and
the second reference transmission power is the physical downlink shared channel transmission power for the first cell.

20. The user equipment of claim 17, wherein the reference signal configuration comprises a channel state information reference signal information element configured for the first cell and comprising the first transmission power control offset, the second transmission power control offset, the third transmission power control offset, and the fourth transmission power control offset.

21. The user equipment of claim 17, wherein the reference signal configuration comprises:
a channel state information reference signal information element configured for the first cell and comprising the first transmission power control offset and the second transmission power control offset; and
a virtual channel state information reference signal information element configured for the second cell and comprising the third transmission power control offset and the fourth transmission power control offset.

22. The user equipment of claim 17, wherein the reference signal configuration comprises:
a first channel state information reference signal information element configured for the first cell and comprising the first transmission power control offset and the second transmission power control offset; and
a second channel state information reference signal information element configured for the second cell and comprising:
the third transmission power control offset;
the fourth transmission power control offset; and
an indication that the second channel state information reference signal information element is a virtual reference signal.

23. The user equipment of claim 17, wherein:
the first transmission power control offset and the second transmission power control offset are associated with a first bandwidth part, and
the third transmission power control offset and the fourth transmission power control offset are associated with a second bandwidth part.

24. The user equipment of claim 17, wherein:
the first transmission power control offset and the second transmission power control offset are associated, within the reference signal configuration, with a first physical cell ID (PCI), and
the third transmission power control offset and the fourth transmission power control offset are associated, within the reference signal configuration, with a second PCI.

25. The user equipment of claim 17, wherein the third transmission power control offset and the fourth transmission power control offset are associated with a virtual reference signal.

26. The user equipment of claim 17, wherein:
the first cell is an active cell, and
the second cell is an inactive cell.

27. The user equipment of claim 17, wherein:
the first cell is an active cell, and
the second cell is configured for fast activation.

28. A method for wireless communication performed by a user equipment, comprising:
receiving, from a network entity, a reference signal configuration that comprises one or more transmission power control offsets for a first cell and one or more transmission power control offsets for a second cell,
wherein the one or more transmission power control offsets for the first cell comprise a first transmission power control offset between a synchronization signal block transmission power for the first cell and a reference signal transmission power for the first cell.

* * * * *